United States Patent
Yamazaki et al.

(10) Patent No.: US 12,517,216 B2
(45) Date of Patent: Jan. 6, 2026

(54) PREVIEW ROAD SURFACE DETECTOR, AND PREVIEW ROAD SURFACE DETECTION METHOD

(71) Applicant: HONDA MOTOR CO., LTD., Tokyo (JP)

(72) Inventors: Ryosuke Yamazaki, Saitama (JP); Kazuya Konada, Saitama (JP); Takashi Yanagi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 18/458,162

(22) Filed: Aug. 30, 2023

(65) Prior Publication Data
US 2024/0103126 A1    Mar. 28, 2024

(30) Foreign Application Priority Data
Sep. 27, 2022 (JP) .................................. 2022-153787

(51) Int. Cl.
*G01S 7/03* (2006.01)
*G01S 13/931* (2020.01)

(52) U.S. Cl.
CPC ............ *G01S 7/038* (2013.01); *G01S 13/931* (2013.01); *G01S 2013/9323* (2020.01)

(58) Field of Classification Search
CPC ................... G01S 7/038; G01S 13/931; G01S 2013/9323; G01S 13/00; G01S 13/60;
(Continued)

(56) References Cited

U.S. PATENT DOCUMENTS 5,497,325 A * 3/1996 Mine .................. B60G 17/0165
                                             280/5.518
12,092,449 B2 * 9/2024 Konada .................... G01S 15/08
(Continued)

FOREIGN PATENT DOCUMENTS

DE    102008062340 A1 * 6/2010 ........... B60G 17/019
JP        H0596922 A * 4/1993
JP       H05164836 A    6/1993

OTHER PUBLICATIONS

DE-102008062340-A1 English translation (Year: 2010).*
Notification of Reasons for Refusal issued Sep. 30, 2025 in the JP Patent Application No. 2022-153787.

*Primary Examiner* — Vladimir Magloire
*Assistant Examiner* — Naomi M Wolford
(74) *Attorney, Agent, or Firm* — CKC & Partners Co. LLC

(57) ABSTRACT

A preview road surface detector is provided, which is capable of suppressing the crosstalk of received detection waves. A preview road surface detector, including: a distance sensor including a plurality of transmitters and at least one receiver installed on a vehicle body member and arranged in a direction intersecting a travel direction of a vehicle, the distance sensor detecting a value related to a distance between the vehicle body member and a measurement point on a road surface ahead of a vehicle, the measurement point corresponding to at least part of a road surface contact portion of a wheel; and a distance calculator that calculates a road surface distance as the distance from the vehicle body member to the measurement point, based on a detection value detected by the distance sensor, in which the transmitters transmit detection waves with a time difference between the adjacent transmitters.

7 Claims, 9 Drawing Sheets

(58) Field of Classification Search
CPC ........ B60G 2600/172; B60G 2600/182; B60G 2400/82; B60G 2400/821; B60G 2400/824; B60G 2400/954; B60G 2400/102; B60G 2401/15; B60G 2401/17; B60G 2401/174; B60G 2401/21; B60W 10/22; B60W 40/06; B60W 2510/22; G01B 11/30; G01B 5/28; G01B 21/30; B60T 2210/10; B60T 2210/14; B60R 2021/01304

See application file for complete search history.

(56) References Cited

U.S. PATENT DOCUMENTS

| | | | |
|---|---|---|---|
| 12,330,465 B2* | 6/2025 | Konada | B60G 17/0182 |
| 12,370,857 B2* | 7/2025 | Konada | B60G 17/019 |
| 2015/0174981 A1* | 6/2015 | Buma | B60W 40/076 |
| | | | 348/148 |
| 2022/0290987 A1 | 9/2022 | Konada et al. | |

* cited by examiner

FIG. 9

| TRANSMITTER | VEHICLE WIDTH DIRECTION OUTER SIDE | | | | VEHICLE WIDTH DIRECTION INNER SIDE |
|---|---|---|---|---|---|
| | 11a | 11b | 11c | 11d | 11e |
| TRANSMISSION SEQUENCE | 1 | 2 | 1 | 2 | 1 |
| | 3 | 4 | 3 | 4 | 3 |

FIG. 10

| TRANSMITTER | VEHICLE WIDTH DIRECTION OUTER SIDE | | | | | VEHICLE WIDTH DIRECTION INNER SIDE |
|---|---|---|---|---|---|---|
| | 11a | 11b | 11c | 11d | 11e | 11f |
| TRANSMISSION SEQUENCE | 1 | 2 | 1 | 2 | 1 | 2 |
| | 3 | 4 | 3 | 4 | 3 | 4 |

PREVIEW ROAD SURFACE DETECTOR, AND PREVIEW ROAD SURFACE DETECTION METHOD

CROSS REFERENCE TO RELATED APPLICATIONS

This application claims the benefit of priority to Japanese Patent Application No. 2022-153787 filed on Sep. 27, 2022. The entire contents of this application are hereby incorporated herein by reference.

BACKGROUND OF THE INVENTION

Field of the Invention

The present invention relates to a preview road surface detector, and a preview road surface detection method.

Related Art

Recently, efforts to provide access to sustainable transport systems that also consider vulnerable participants in traffic, such as the elderly, people with disabilities, and children, have been intensified. In pursuit of this goal, research and development have been focusing on further improvement of traffic safety and convenience through development related to vehicle behavior stability.

In order to improve vehicle behavior stability, conventional active suspensions for vehicles such as automobiles are known, and one of such active suspensions includes: a road surface detector that detects road surface displacement ahead using an optical sensor; a vehicle speed detector that detects the speed of the vehicle; a vertical acceleration detector installed on the vehicle body at a position corresponding to the front wheels, the vertical acceleration detector detecting vertical acceleration of the vehicle body; and a storage that stores information on road surface displacement and vertical acceleration in a time series, in which, when it is determined that the detected road surface displacement is abnormal, vertical acceleration of a portion corresponding to the rear wheels of the vehicle body at the time of the vehicle having travelled a distance equivalent to the wheelbase is estimated from the vertical acceleration stored in the storage, based on the wheelbase and the vehicle speed, and then the actuator of the rear wheels is predictively controlled in accordance with the estimated vertical acceleration (refer to Patent Document 1).

Patent Document 1: Japanese Unexamined Patent Application, Publication No. H05-96922

SUMMARY OF THE INVENTION

However, the problem with conventional technologies is the potential for crosstalk of laser waves or the like transmitted from a plurality of road surface sensors, and there is a need to more accurately recognize road surface conditions. Therefore, the present invention aims to solve the above-mentioned problems by providing a preview road surface detector that is capable of suppressing the crosstalk of received detection waves transmitted from a plurality of transmitters. Further, the present invention contributes to the energy efficiency.

(1) In order to solve the aforementioned problems, a preview road surface detector of the present invention includes: a distance sensor including a plurality of transmitters and at least one receiver installed on a vehicle body member and arranged in a direction intersecting a travel direction of a vehicle, the distance sensor detecting a value related to a distance between the vehicle body member and a measurement point on a road surface ahead of the vehicle, the measurement point corresponding to at least part of a road surface contact portion of a wheel; and a distance calculator that calculates a road surface distance as the distance from the vehicle body member to the measurement point, based on a detection value detected by the distance sensor, in which the transmitters transmit detection waves with a time difference between the adjacent transmitters.

With the preview road surface detector as such, a preview road surface detector capable of suppressing the crosstalk of received detection waves transmitted from a plurality of transmitters can be provided.

(2) In the preview road surface detector of the present invention, the detection waves are transmitted from the transmitters towards the road surface, and the detection waves are laser waves or millimeter waves.

With the preview road surface detector as such, accurate calculation of road surface distances becomes easier.

(3) In the preview road surface detector of the present invention, when at least one of the plurality of transmitters is a first transmitter, the first transmitter further includes a second transmitter arranged ahead or behind the first transmitter in the travel direction of the vehicle, and the first transmitter and the second transmitter transmit detection waves with a time difference.

With the preview road surface detector as such, when the amount of movement of the vehicle body in the pitch direction is estimated based on the detection values detected by the first and second transmitters, the crosstalk of transmitted detection waves can be suppressed. Crosstalk which may occur between detection waves originating from different positions in the front and rear of the vehicle can significantly impact malfunctions. Occurrence of such significant malfunctions can be suppressed.

(4) In the preview road surface detector of the present invention, one or more of the at least one receiver is arranged at an end in a vehicle width direction, and the transmitters are installed such that transmission directions thereof tilt towards the side of one or more of the at least one receiver.

With the preview road surface detector as such, the reception sensitivity in the case of receiving with fewer receivers can be enhanced, while suppressing the crosstalk of detection waves transmitted from transmitters with a small time difference in transmission, in particular, simultaneously transmitted detection waves.

(5) In the preview road surface detector of the present invention, the plurality of transmitters are divided into a plurality of groups, and the plurality of transmitters in each group simultaneously transmit detection waves.

With the preview road surface detector as such, the total transmission frequency per unit time across the plurality of transmitters can be increased, as compared to the situation where there is only one transmitter capable of simultaneous transmission.

(6) In the preview road surface detector of the present invention, the at least one receiver includes a plurality of receivers, and transmission directions of the plurality of transmitters that simultaneously transmit the detection waves tilt towards the sides of different receivers among the plurality of receivers.

With the preview road surface detector as such, the reception sensitivity in the case of receiving with fewer receivers can be enhanced, while suppressing the crosstalk of detection waves transmitted from transmitters with a small time difference, in particular, simultaneously transmitted detection waves.

(7) In order to solve the aforementioned problems, a preview road surface detection method of the present invention includes: a distance detecting step of detecting a value related to a distance between a vehicle body member and a measurement point on a road surface ahead of a vehicle, the measurement point corresponding to at least a central portion of a road surface contact portion of a wheel, the distance detected by way of a plurality of transmitters and at least one receiver installed on the vehicle body member and arranged in a direction intersecting a travel direction of the vehicle; and a distance calculating step of calculating a road surface distance, which is the distance from the vehicle body member to the measurement point, based on a detection value detected in the distance detecting step, in which in the distance detecting step, the transmitters transmit detection waves with a time difference between the adjacent transmitters.

With the preview road surface detection method as such, a preview road surface detection method can be provided, which is capable of suppressing the crosstalk of received detection waves transmitted from the plurality of transmitters.

Note that the above-described (1) to (7) can be arbitrarily combined as needed.

According to the present invention, a preview road surface detector can be provided, which is capable of suppressing the crosstalk of received detection waves transmitted from a plurality of transmitters.

BRIEF DESCRIPTION OF THE DRAWINGS

FIG. 9 is a table illustrating a transmission sequence of transmitters; and

FIG. 10 is another table illustrating a transmission sequence of transmitters.

DETAILED DESCRIPTION OF THE INVENTION (Suspension System)

Figure 1:
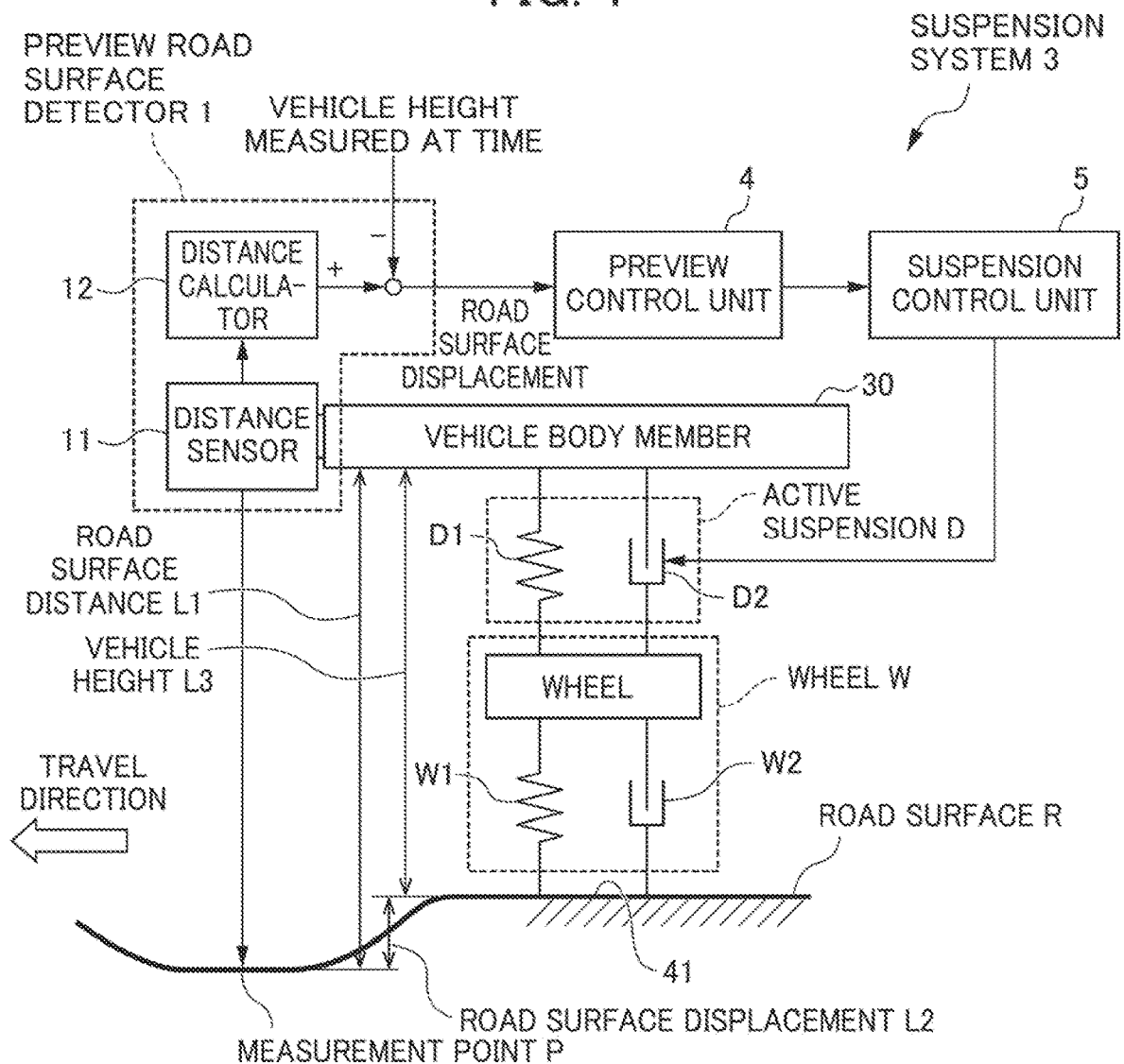
FIG. 1 is a diagram illustrating an overview of a suspension system of a vehicle.

Embodiments of the present invention will now be described with reference to the accompanying drawings. FIG. 1 is a diagram illustrating an overview of a suspension system 3 of a vehicle to which a preview road surface detector 1 of the present embodiment is applied.

The suspension system 3 includes the preview road surface detector 1, a preview control unit 4, a suspension control unit 5, a vehicle body member 30, an active suspension D, and wheels W. Further, the preview road surface detector 1 is provided with a distance calculator 12 and a distance sensor 11. The distance sensor 11 is provided with a transmitter 11a or the like, and a receiver 14. Note that the transmitter 11a or the like, and the receiver 14, are not illustrated in FIG. 1, and are sequentially illustrated from FIG. 3 onwards.

In the suspension system 3, the suspension control unit 5 controls the active suspension D to stabilize the posture of the vehicle body member 30. This control is performed based on, for example, the Skyhook theory.

(Road Surface Displacement)

When controlling the active suspension D, first, the preview road surface detector 1 acquires a road surface displacement L2 ahead of the vehicle. Here, the road surface displacement L2 refers to a distance between the road surface R currently in contact with the wheel W and the measurement point P, in the direction vertical to the road surface R. Note that the road surface R refers to the ground in contact with the wheel W. The measurement point P refers to a point on the ground where the distance sensor 11 measures the distance. The measurement point P is also a point on the road surface R that the wheel W is expected to overpass. The road surface displacement L2 is also referred to as predictive information.

(Preview Control Unit)

Next, the preview control unit 4 acquires the road surface displacement L2 from the preview road surface detector 1. Then, based on the value of the road surface displacement L2, the response delay of the active suspension D is compensated. In this manner, the suspension system 3 aims to improve the ride comfort of the vehicle.

(Configuration of Vehicle)

Figure 2:
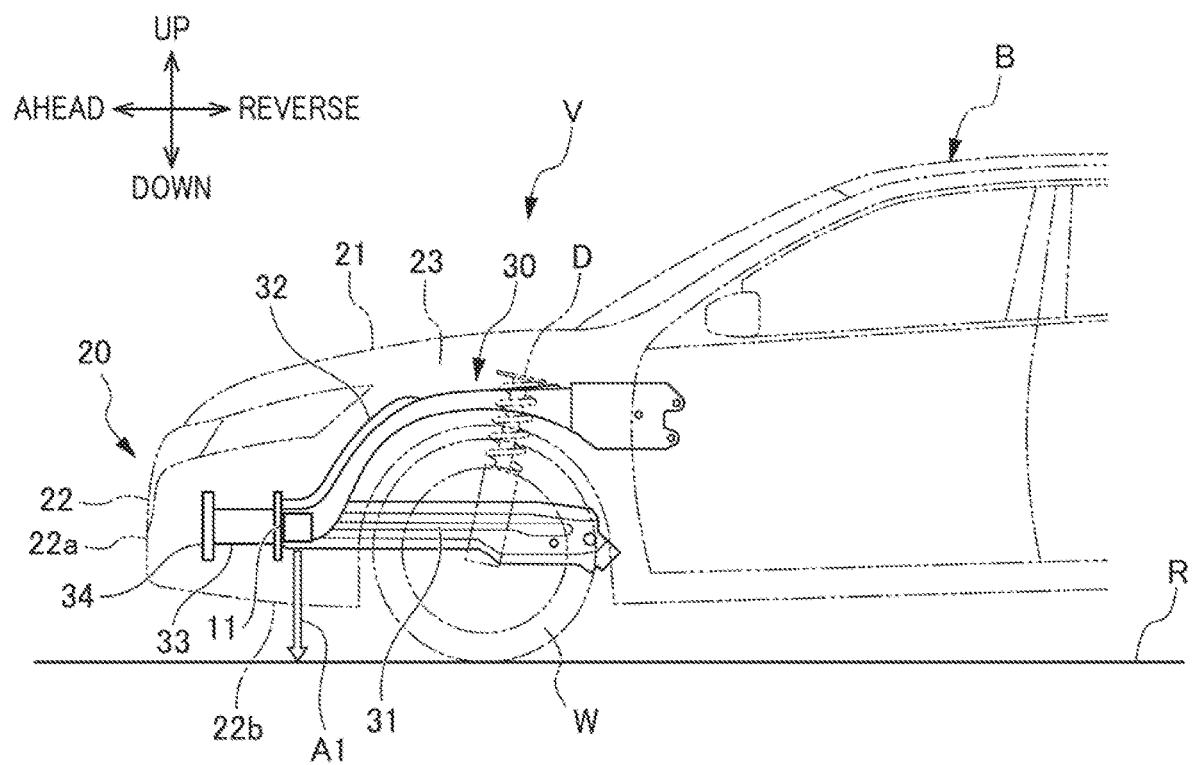
FIG. 2 is a side view of the vehicle, illustrating an installation structure of a distance sensor.

Referring also to FIG. 2, the suspension system 3 is described more specifically. FIG. 2 is a side view of the vehicle V, illustrating the installation mechanism of the distance sensor 11. The vehicle V is provided with a vehicle body B and wheels W. The members constituting the vehicle body B include the vehicle body member 30. Wheels W are provided on the lower side of the vehicle body member 30. FIG. 2 illustrates a front wheel of the wheels W. The front wheels include a left-side wheel and a right-side wheel. FIG. 2 illustrates the left-side wheel among the left and right wheels.

(Vibration Model)

The active suspension D, as well as the tire portion of the wheels W, absorbs unevenness of the road surface R. The suspension control unit 5, as illustrated in FIG. 1, controls the tire portion of the wheels W, as a vibration model. This vibration model is a parallel arrangement of a spring W1 and a damper W2.

(Active Suspension)

The active suspension D can control the damping force using a suspension spring D1 and a hydraulic actuator. Alternatively, the active suspension D can be configured with the suspension spring D1 and a variable damper D2 arranged in parallel. The variable damper D2 is a damper that controls the damping force and the thrust by way of an electromagnetic force. The active suspension D is provided between the vehicle body member 30 and the wheel W.

(Suspension Control Unit)

The suspension control unit 5 controls the variable damper D2 as the control target.

(Actuator)

Note that the active suspension D may be provided with an actuator. By the operation of the actuator, the preview control of the suspension can be carried out more smoothly. If an actuator is provided, it is preferable to have an actuator control unit for controlling the actuator. The actuator control unit can, for example, be provided as part of the suspension control unit 5.

(Preview Road Surface Detector)

The preview road surface detector 1 is installed on the vehicle body member 30. The preview road surface detector 1 is provided with a distance sensor 11 and a distance calculator 12.

(Distance Sensor)

The distance sensor 11 measures a distance between the vehicle body member 30 and the measurement point P on the road surface R. The distance between the vehicle body member 30 and the measurement point P on the road surface R is referred to as a road surface distance L1. This measurement is performed using a technique such as ultrasound, laser light, or millimeter-wave radar.

(Distance Calculator)

The distance calculator 12 calculates the road surface displacement L2 ahead of the wheel W, based on the measurement values of the distance sensor 11. Specifically, the preview road surface detector 1 calculates the road surface displacement L2 ahead of the wheel W by subtracting a vehicle height L3 measured at the time from the road surface distance L1 calculated by the distance calculator 12. The vehicle height L3 is a distance between the vehicle body member 30 and the road surface R at the road surface contact portion 41.

In other words, ROAD SURFACE DISTANCE L1—VEHICLE HEIGHT L3=ROAD SURFACE DISPLACEMENT L2. Note that when calculating the road surface displacement L2, the vehicle height L3 can also be obtained by referencing a value calculated by the suspension control unit 5 as a control variable.

(Time Required to Arrive)

The preview control unit 4 calculates the time required for the wheel W to arrive at the measurement point P in the road surface displacement L2, based on the vehicle speed at the time of measuring the road surface displacement L2 and the distance from the tire contact point to the measurement point P in the road surface displacement L2 in the travel direction of the vehicle V. This time required is referred to as "time required to arrive". Note that the distance from the tire contact point to the measurement point P in the road surface displacement L2 in the travel direction of the vehicle V can also be obtained by referencing information on the installation position of the distance sensor 11.

(Predictive Information)

The preview road surface detector 1 and the preview control unit 4 can periodically perform the aforementioned process for obtaining the road surface displacement L2. In this manner, predictive information on the road surface displacement L2 can be obtained. Predictive information refers to information on the road surface condition ahead of the wheel W, which will be overpassed after a predetermined time, as described earlier. The road surface condition includes factors such as the road surface displacement L2 and the unevenness of the road surface R.

The suspension control unit 5 controls the active suspension D, based on the predictive information on the road surface displacement L2. Therefore, the suspension control unit 5 can improve the ride comfort of the vehicle V.

(Installation of Preview Road Surface Detector)

The preview road surface detector 1 of the present embodiment includes the distance sensor 11 and the distance calculator 12, as described above. Among these, the distance sensor 11 is installed on the vehicle body member 30. On the other hand, the distance calculator 12 is implemented in the Electronic Control Unit (ECU) of the vehicle V.

(Installation of Distance Sensor)

Installation of the distance sensor 11 will be specifically described based on FIG. 2. Note that an installation structure of the distance sensor 11, as well as other structures of the vehicle V illustrated in FIG. 2, is simplified for the convenience of explanation. Installation of the distance sensor 11 is not limited to the one described below.

(Definition of Directions)

Note that the travel direction of the vehicle V is referred to as 'ahead' direction, the reverse direction as 'reverse' direction, the upward vertical direction as 'up' direction, the downward vertical direction as 'down' direction, and the widthwise direction as 'left' and 'right' directions for the purpose of explanation. The installation structure of the vehicle sensors such as the distance sensor 11 is essentially bilaterally symmetrical. Therefore, the following description will primarily focus on one side (the left side) while omitting the description of the other side (the right side) as appropriate.

FIG. 2 is a side view of the vehicle V, illustrating the installation structure of the distance sensor 11. Note that the outline of the vehicle V is indicated by the phantom line in FIG. 2.

(Vehicle Body)

The vehicle V includes the vehicle body B as its main constituent. The vehicle body B includes, in addition to the vehicle body member 30, the exterior member 20 and the distance sensor 11, etc. The distance sensor 11 is fixed to the vehicle body member 30.

The exterior member 20 is a member that forms the outer portion of the vehicle V. The exterior member 20 forms the outer shell of the vehicle V. On the other hand, the distance sensor 11 is a device that detects the road surface condition.

(Vehicle)

As long as the vehicle V is an automobile provided with the vehicle body member 30, the exterior member 20, and the distance sensor 11 as described above, the specific type and model of the vehicle are not limited in particular. The vehicle V can, for example, be a passenger car, bus, truck, utility vehicle, or the like.

Each member will be described below in more detail.

(Vehicle Body Member)

The vehicle body member 30 has the function of supporting the exterior member 20. Moreover, the vehicle body member 30 is composed of members such as a front side frame 31, an upper member 32, a bumper beam extension 33, and a bumper beam 34. Note that the front side frame 31, the upper member 32, and the bumper beam 34 may be referred to as frame members.

(Exterior Member)

The exterior member 20 includes an engine hood 21, a front bumper 22, and a front fender 23. Note that the front bumper 22 may simply be referred to as "bumper".

The engine hood 21 is a panel member that covers the upper surface of a portion ahead of the windshield. The front bumper 22 is located on the front side of the vehicle V and is composed of, for example, a panel member made of synthetic resin. In addition, the front bumper 22 includes a front portion 22a where an air intake and the like are provided, and a bottom portion 22b that extends rearward from the lower end of the front portion 22a. The front fender 23 is a panel member that covers the area around the wheel W.

(Installation of Distance Sensor)

The distance sensor 11 is a sensor that detects the condition of the road surface R ahead of the vehicle V. The distance sensor 11 is fixed to the upper member 32. The upper member 32 is a member that constitutes the vehicle body member 30, as described above. The upper member 32 is arranged ahead of the wheel W.

More specifically, the distance sensor 11 is installed on the outer side surface of the upper member 32 in the vehicle width direction. The distance sensor 11 is located at the front end of the upper member 32 in the longitudinal direction.

(Configuration of Distance Sensor)

The distance sensor 11 of the present embodiment is configured to detect the road surface distance L1 at the road surface R immediately ahead of the wheel W, as indicated with the arrow A1 in FIG. 2. The road surface distance L1 is a distance between the vehicle body member 30 and the measurement point P on the road surface R. The distance sensor 11 can be appropriately selected from various types of sensors such as radar-based, camera-based, and laser-based sensors. The distance sensor 11 does not need to be composed of a single type of sensor. The distance sensor 11 can be configured by combining plural types of sensors, such as a camera-based sensor and a laser-based sensor, for example.

(Transmitter and Receiver)

Next, detection of a distance by the distance sensor 11 will be described based on FIG. 3. FIG. 3A illustrates an appearance of the distance sensor 11 when the wheel W is viewed from ahead of the vehicle V. The distance sensor 11 of the present embodiment is provided with five transmitters, from transmitter 11a to transmitter 11e. Each transmitter transmits a detection wave towards the road surface R. The transmitted detection wave is reflected on the road surface R and received by a receiver. The receiver will be explained later based on figures such as FIG. 6.

The detection wave can be, for example, a laser wave or a millimeter wave. The method of detecting a distance by the transmitter and receiver is not limited in particular. Various approaches can be employed as the detection method, such as a method based on the principle of triangulation, a method that converts the reflected intensity of transmitted light into a distance, a method that calculates a distance based on the flight time of laser light, and so forth.

Detection of a distance will be specifically described. As illustrated in FIG. 3A, the wheel W is in contact with a tire-road contact surface S1 of the road surface R. Detection waves are transmitted from the five transmitters 11a to 11e towards the measurement surface S2 of the road surface. The transmitters illustrated in FIG. 3A are referred to as, in order from the outer side to the inner side in the vehicle width direction, a first transmitter 11a, a second transmitter 11b, a third transmitter 11c, a fourth transmitter 11d, and a fifth transmitter 11e. The detection waves transmitted from the respective transmitters are referred to as a first detection wave Ra, a second detection wave Rb, a third detection wave Rc, a fourth detection wave Rd, and a fifth detection wave Re.

In FIG. 3A, the width of the part where the tire W contacts the road surface R is illustrated as a road surface contact width L4. In the configuration illustrated in FIG. 3A, among the five transmitters, the fourth detection wave Rd transmitted from the fourth transmitter 11d and the fifth detection wave Re transmitted from the fifth transmitter 11e are transmitted towards the measurement surface S2, which is positioned on the inner side of the road surface contact width L4 in the vehicle width direction. By arranging the transmitters in this manner, a road surface distance can be obtained over a wider range. This allows for monitoring a wider range of road surface conditions. As a result, the road surface conditions can be accurately recognized. This facilitates more appropriate control of the suspension, even when the vehicle V deviates in the lateral direction, that is, when turning left or right.

Note that the arrangement of the transmitters illustrated in FIG. 3A is exemplary, and the positions of the transmitters can be changed as appropriate. The receiver, which receives the detection waves transmitted from the transmitters and reflected on the road surface R, can be arranged at any arbitrary position as appropriate. For example, the receiver may be integrated with each transmitter and arranged with each transmitter. Alternatively, the receiver may be separate from the transmitters and arranged at a position different from the transmitters. The number of transmitters does not necessarily be the same as the number of receivers. The receiver may receive detection waves transmitted from the plurality of transmitters. This will be described in detail later.

(Timing of Transmission)

In the preview road surface detector 1 of the present embodiment, the transmitters transmit detection waves with a time difference between adjacent transmitters. Description is provided based on FIG. 3B. FIG. 3B is a diagram illustrating the transmission sequence of detection waves from each transmitter. As illustrated in FIG. 3B, after the first transmitter 11a transmits, the second transmitter 11b adjacent to the first transmitter 11a does not transmit. The third transmitter 11c, which is not adjacent to the first transmitter 11a, transmits after the first transmitter 11a. The same pattern continues for the subsequent transmitters. After the third transmitter 11c transmits, the fourth transmitter 11d adjacent to the third transmitter 11c does not transmit. After the third transmitter 11c transmits, the fifth transmitter 11e, which is not adjacent to the third transmitter 11c, transmits. Thereafter, transmissions continue in the order as illustrated in FIG. 3B. As described above, the transmitters do not transmit consecutively with adjacent transmitters. In this manner, the transmitters are adjusted to transmit with a time difference between adjacent transmitters.

The timing of transmissions as described above can be adjusted in the same manner, even if the number of transmitters changes. Description is provided based on FIGS. 4A and 4B. FIG. 4A is a diagram corresponding to FIG. 3A, and FIG. 4B is a diagram corresponding to FIG. 3B. The number of transmitters is different between the configurations illustrated in FIGS. 3 and 4. The configuration illustrated in FIG. 3 has five transmitters. In contrast, the configuration illustrated in FIG. 4 has six transmitters. In the configuration illustrated in FIG. 4, a sixth transmitter 11f is further arranged on the inner side of the fifth transmitter 11e in the vehicle width direction. A detection wave transmitted from the sixth transmitter 11f is referred to as a sixth detection wave Rf.

As illustrated in the transmission sequence of FIG. 4B, even when the number of transmitters becomes six, the timing of transmissions is adjusted to ensure that the transmitters do not transmit consecutively with adjacent transmitters. As a result, the transmitters transmit with a time difference between adjacent transmitters.

(Transmission Frequency of Transmitters)

The transmission frequency of the transmitter is not limited in particular. The transmission frequency can, for example, be set to 1,000 Hz or higher. In other words, this frequency is 1 msec per cycle. Alternatively, the transmission frequency can be set to achieve a measurement cycle ranging from a minimum of 15 mm per cycle to a maximum of 30 mm per cycle. Here, the distance refers to a travel distance of the transmitters.

(Longitudinal Arrangement of Transmitters)

Figure 3:
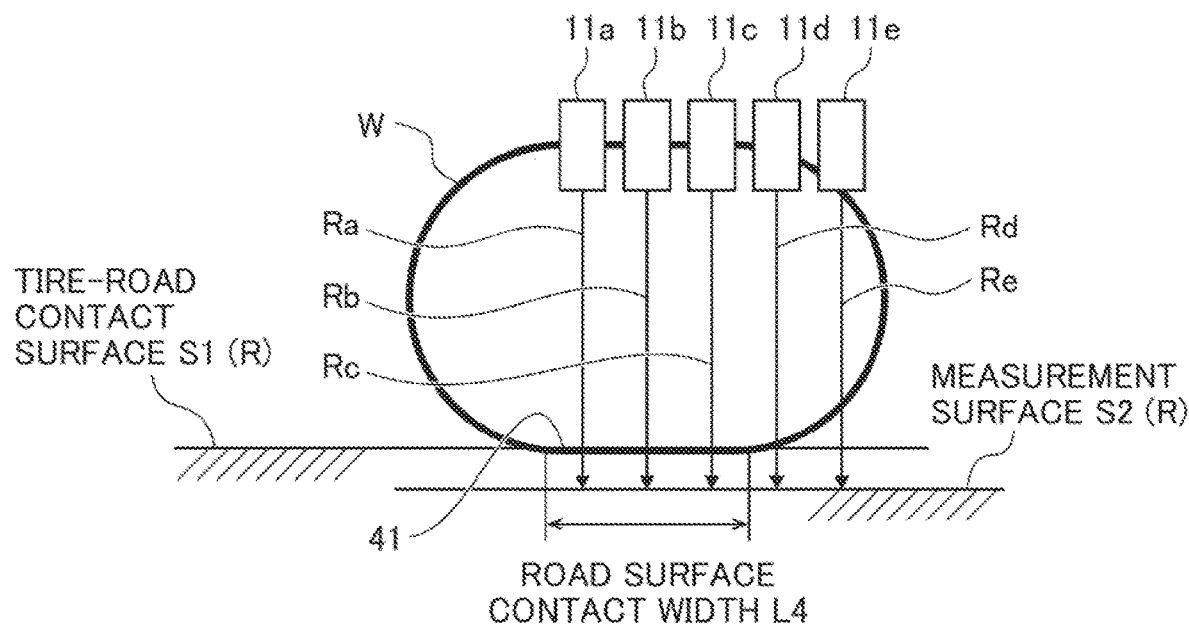
FIG. 3A is a diagram illustrating an arrangement of distance sensors.
FIG. 3B illustrates a transmission sequence of transmitters.
Figure 4:
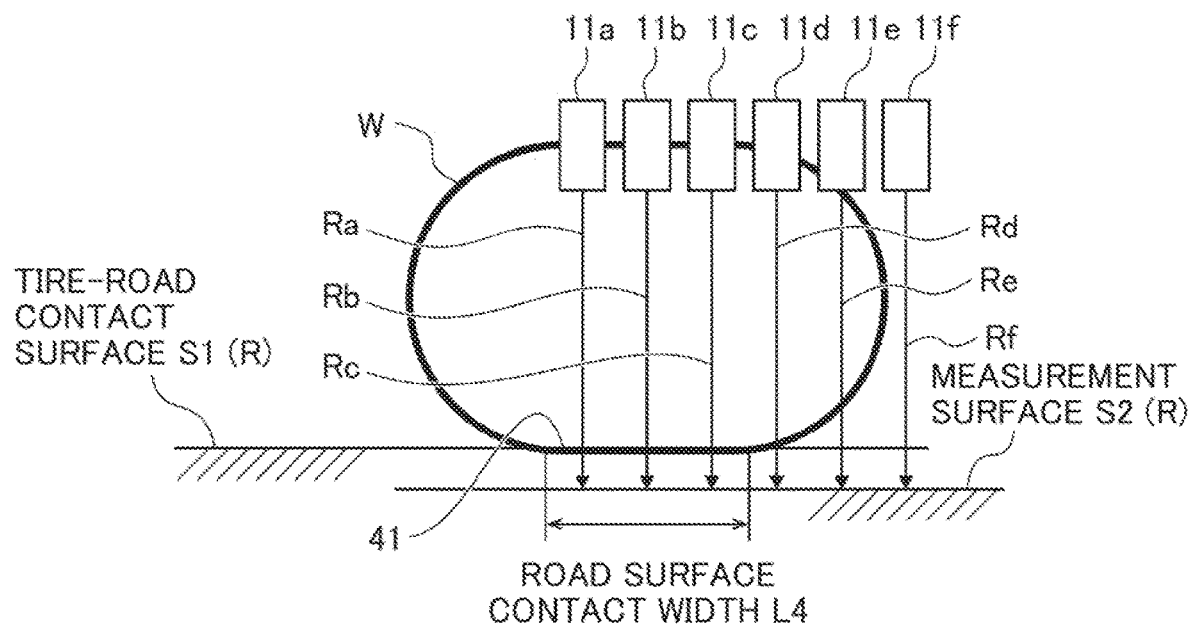
FIG. 4A is another diagram illustrating an arrangement of distance sensors.
FIG. 4B illustrates a transmission sequence of transmitters.
Figure 5:
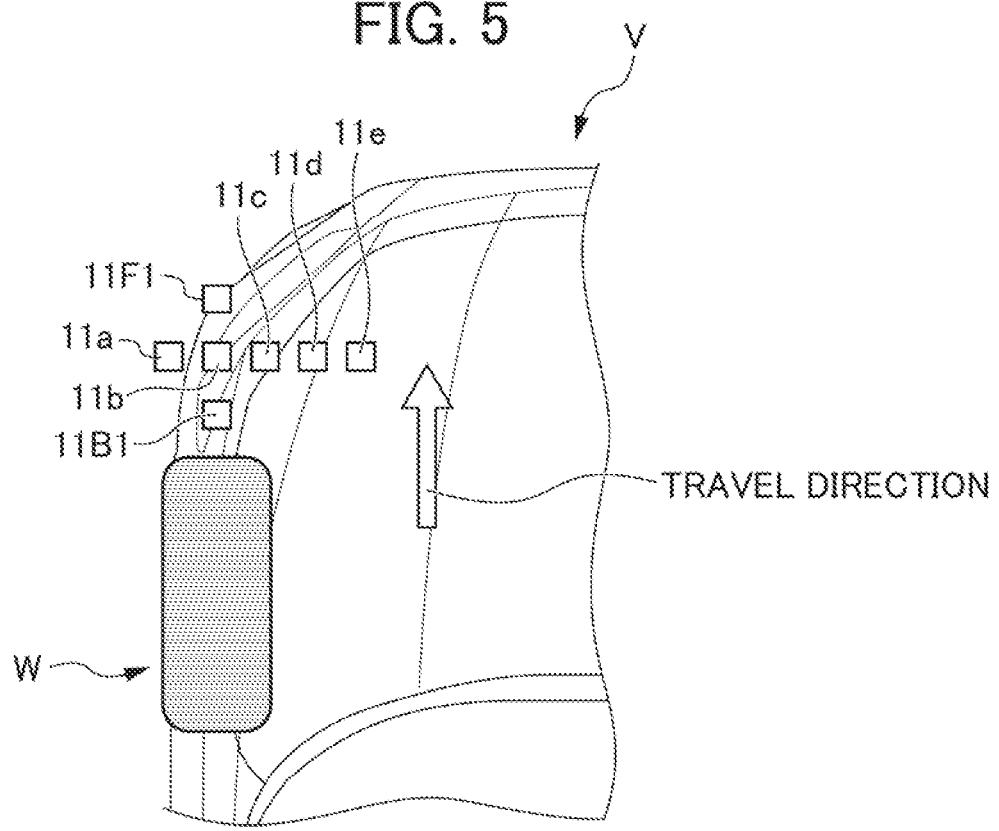
FIG. 5 is a view of the vicinity of a left front wheel of the vehicle, as observed from above the vehicle.

In FIGS. 3 and 4, the plurality of transmitters are installed as arranged in a direction intersecting with the travel direction of the vehicle V. In other words, the plurality of transmitters are arranged in the width direction of the vehicle. The transmitters can also be arranged in a row along the travel direction of the vehicle V. Description is provided based on FIG. 5. FIG. 5 is a view of the vicinity of the left front wheel of the vehicle V, as observed from above the vehicle V.

As illustrated in FIG. 5, a first forward transmitter 11F1 is arranged ahead of the second transmitter 11b in the travel direction. A first backward transmitter 11B1 is arranged behind the second transmitter 11b in the travel direction.

In the configuration as illustrated in FIG. 5, the second transmitter 11b and the first forward transmitter 11F1 transmit detection waves with a time difference. The second transmitter 11b and the first backward transmitter 11B1 transmit detection waves with a time difference. This can suppress the crosstalk of received detection waves.

Note that it is not necessary to provide both a forward transmitter and a backward transmitter as the transmitters in the longitudinal direction. Either the forward transmitter or the backward transmitter can be provided alone.

By arranging the transmitters in the longitudinal direction relative to the travel direction of the vehicle V, more accurate preview control can be achieved, for example, when the vehicle makes a turn. However, the crosstalk of detection waves, which may occur while receiving the detection waves, is likely to lead to significant malfunctions. In this regard, the preview road surface detector of the present embodiment can suppress the crosstalk of detection waves between transmitters arranged in the longitudinal direction. This is because those transmitters transmit detection waves with a time difference.

(Manners of Arranging Receivers)

Figure 6:
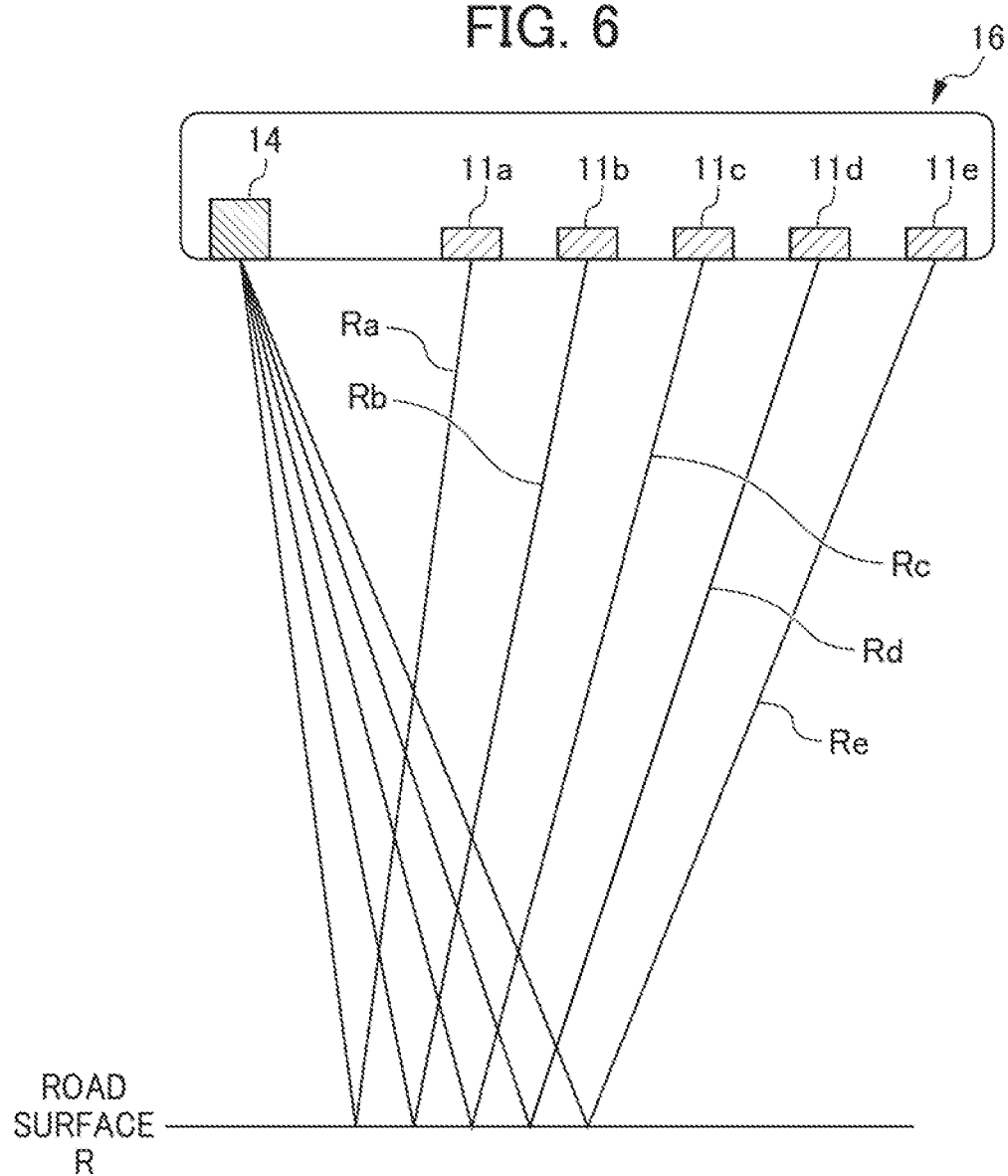
FIG. 6 is a diagram illustrating an example of arranging transmitters and receivers.
Figure 7:
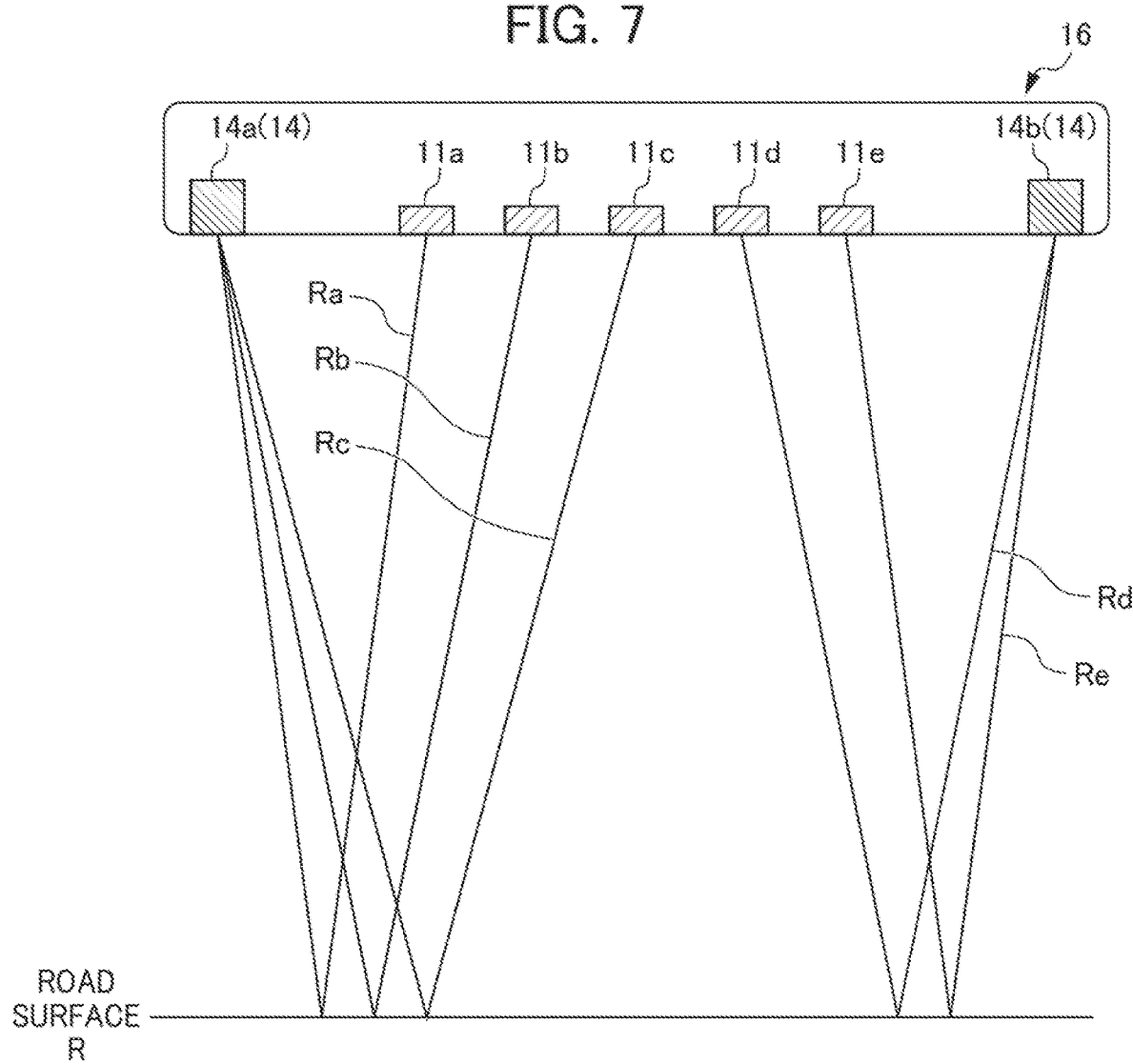
FIG. 7 is another diagram illustrating an example of arranging transmitters and receivers.
Figure 8:
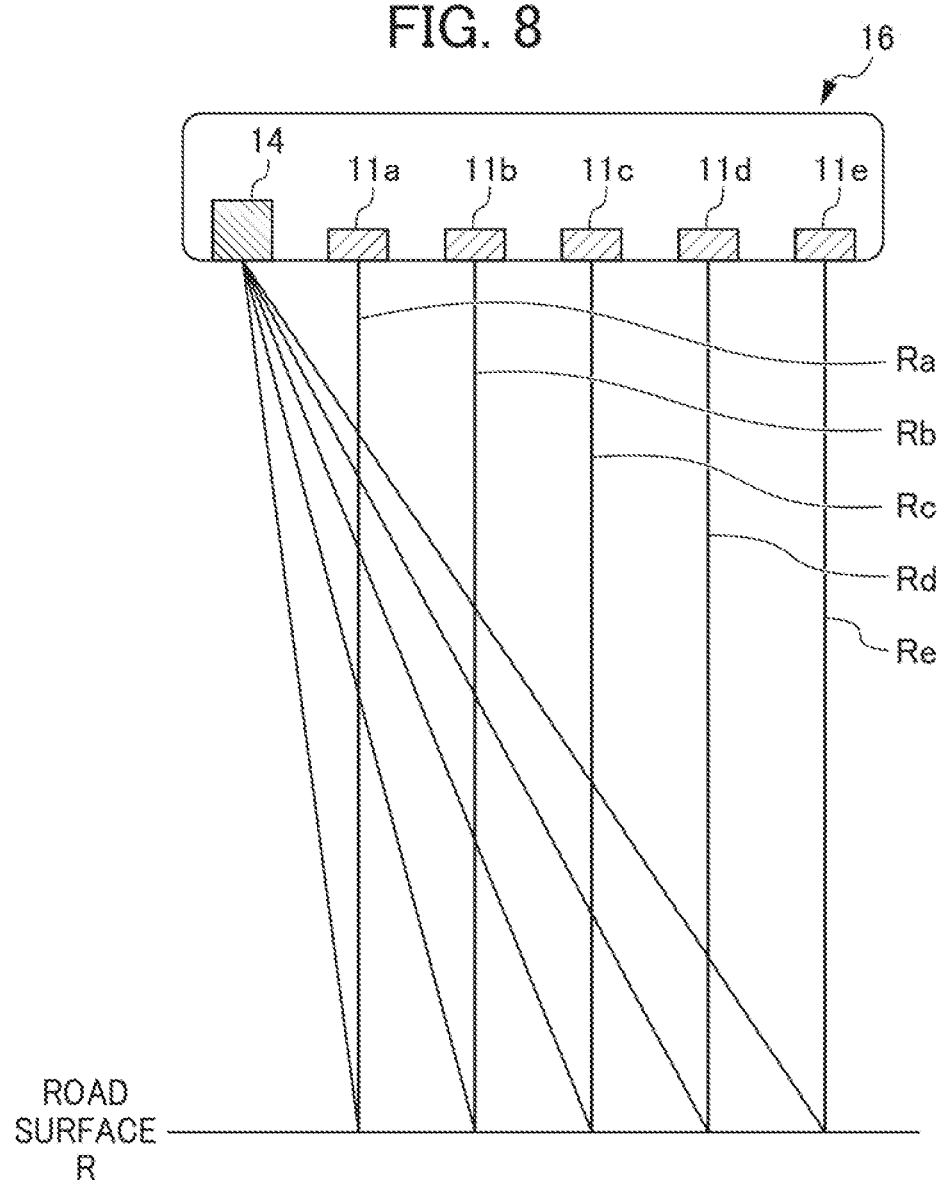
FIG. 8 is yet another diagram illustrating an example of arranging transmitters and receivers.

There are various manners of arranging the receivers. For example, as described earlier, the receiver can be arranged integrally with the transmitter. In contrast, FIGS. 6 to 8 illustrate the configurations where the receivers are arranged separately from the transmitters. FIGS. 6 to 8 respectively illustrate the different arrangements of the receivers and transmitters.

As an example of the receiver arrangement, one or more receivers are arranged at the ends in the width direction, and the transmitters can be installed such that transmission directions thereof inclined towards the sides of the one or more receivers. Specific description is provided below.

In the arrangement example illustrated in FIG. 6, the transmitters and the receivers 14 are arranged within the sensor housing 16. Within the sensor housing 16, the five transmitters including the first transmitter 11a to the fifth transmitter 11e are arranged side by side in the vehicle width direction. The receiver 14 is arranged at one end in the vehicle width direction within the sensor housing 16.

The transmission directions of the detection waves from the respective transmitters are not perpendicular to the road surface R. The transmission directions are inclined towards the direction of the receiver 14. As a result, the detection waves reflected on the road surface R efficiently reach the receiver 14. Therefore, even in the case of receiving with fewer receivers 14, decrease in reception sensitivity can be suppressed.

Next, an arrangement example illustrated in FIG. 7 is described. The arrangement example illustrated in FIG. 7 is different from the arrangement example illustrated in FIG. 6, and includes two receivers 14 within the sensor housing 16. Specifically, a first receiver 14a is arranged at one end of the sensor housing 16 in the vehicle width direction, and a second receiver 14b is arranged at the other end of the sensor housing 16 in the vehicle width direction.

The first detection wave Ra transmitted from the first transmitter 11a, the second detection wave Rb transmitted from the second transmitter 11b, and the third detection wave Rc transmitted from the third transmitter 11c are received by the first receiver 14a. In contrast, the fourth detection wave Rd transmitted from the fourth transmitter 11d and the fifth detection wave Re transmitted from the fifth transmitter 11e are received by the second receiver 14b.

To ensure efficient reception, the transmission directions of the detection waves from the first transmitter 11a, the second transmitter 11b, and the third transmitter 11c are inclined towards the direction of the first receiver 14a. In contrast, the transmission directions of the detection waves from the fourth transmitter 11d and the fifth transmitter 11e are inclined towards the direction of the second receiver 14b. With this arrangement, even in the case of receiving with fewer receivers, the detection waves can be efficiently received while minimizing the load on each individual receiver.

(Simultaneous Transmission)

The arrangement example illustrated in FIG. 7 can be used in the case where a plurality of transmitters simultaneously transmit detection waves, and the transmission directions of the transmitters are tilted towards different sides of respective receivers. For example, a case where the third transmitter (11c) and the fourth transmitter (11d) simultaneously transmit detection waves is considered. The transmission direction of the third transmitter (11c) is inclined towards the side of the first receiver (14a). In contrast, the transmission direction of the fourth transmitter 11d is inclined towards the side of the second receiver 14b. In this manner, the transmission directions of the simultaneously transmitted detection waves can be inclined towards different sides of the respective receivers. As a result, the crosstalk of detection waves transmitted from adjacent transmitters can be suppressed.

(Perpendicular Transmission)

Note that even in the case of using fewer receivers, the transmission directions of the detection waves from the respective transmitters is not limited to the directions inclined towards the receiver 14. As illustrated in FIG. 8, even in the case of using one receiver, the transmission directions of the detection waves from the respective transmitters can be perpendicular to the road surface R. With such a configuration, the sensor housing 16 can be easily downsized. This is because the distance between the transmitters and the receiver 14 in the width direction of the vehicle can be reduced.

(Grouping)

Grouping of transmitters is described below. Transmitters can be divided into a plurality of groups. The transmitters in each group simultaneously transmit detection waves. Specifically, the plurality of transmitters belonging to the same group simultaneously transmit detection waves. Description below is provided based on FIGS. 9 and 10. FIGS. 9 and 10 both illustrate the transmission sequence of the transmitters. The number of transmitters is different between the transmission sequences illustrated in FIGS. 9 and 10. The configuration illustrated in FIG. 9 has five transmitters. On the other hand, the configuration illustrated in FIG. 10 has six transmitters. In terms of the arrangement of transmitters, the transmission sequence illustrated in FIG. 9 corresponds to the arrangement in FIG. 3A. On the other hand, the transmission sequence illustrated in FIG. 10 corresponds to the arrangement illustrated in FIG. 4A.

(Grouping)

In the transmission sequence shown in FIG. 9, the first transmitter 11a, the third transmitter 11c, and the fifth transmitter 11e belong to the first group. The remaining second transmitter 11b and fourth transmitter 11d belong to the second group. The three transmitters belonging to the first group simultaneously transmit. Next, the two transmitters belonging to the second group simultaneously transmit. Thereafter, this process is sequentially repeated. This allows for increasing the transmission frequency while ensuring that adjacent transmitters do not simultaneously transmit.

As mentioned earlier, the transmission sequence illustrated in FIG. 10 has one more transmitter than the transmission sequence illustrated in FIG. 9. Therefore, the sixth transmitter 11f is added to the second group, in addition to the second transmitter 11b and the fourth transmitter 11d. As a result, both the first group and the second group have three transmitters each.

Even if the number of transmitters increases, the transmission sequence can be similar to the transmission sequence described in FIG. 9. Specifically, first, the three transmitters belonging to the first group simultaneously transmit. Next, the three transmitters belonging to the second group simultaneously transmit. Thereafter, this process is sequentially repeated. Even in the case of increasing the number of transmitters, this allows for increasing the transmission frequency while ensuring that adjacent transmitters do not simultaneously transmit.

(Preview Road Surface Detection Method)

Using the preview road surface detector 1 of the present embodiment, the following preview road surface detection method can also be executed. A preview road surface can be detected with a preview road surface detection method, including: a distance detecting step of detecting a value related to a distance between a vehicle body member 30 and a measurement point P on a road surface ahead of a vehicle V, the measurement point P corresponding to at least a central portion 43 of a road surface contact portion 41 of a wheel W, the distance detected by way of a plurality of transmitters and at least one receiver 14 installed on the vehicle body member 30 and arranged in a direction intersecting a travel direction of the vehicle V; and a distance calculating step of calculating a road surface distance L1, which is a distance from the vehicle body member 30 to the measurement point P, based on a detection value detected in the distance detecting step, in which, in the distance detecting step, the transmitters transmit detection waves with a time difference between the adjacent transmitters.

The embodiments of the present invention have been described above; however, the present invention is not limited to the aforementioned embodiments, and various modifications, alterations, and combinations are possible.

EXPLANATION OF REFERENCE NUMERALS 1 preview road surface detector
3 suspension system
4 preview control unit
5 suspension control unit
11 distance sensor
11a to 11f transmitter
12 distance calculator
14 receiver
16 sensor housing
20 exterior member
41 road surface contact portion
43 central portion
30 vehicle body member
B vehicle body
D active suspension
D1 suspension spring
D2 variable damper
L1 road surface distance
L2 road surface displacement
L3 vehicle height
L4 road surface contact width
P measurement point
R road surface
V vehicle
W wheel
W1 spring
W2 damper
Ra to Re detection wave

What is claimed is:

1. A preview road surface detector, comprising:
a distance sensor including a plurality of transmitters and at least one receiver installed on a vehicle body member and arranged in a direction intersecting a travel direction of a vehicle, the distance sensor detecting a value related to a distance between the vehicle body member and a measurement point on a road surface ahead of the vehicle, the measurement point corresponding to at least part of a road surface contact portion of a wheel; and
a distance calculator that calculates a road surface distance as the distance from the vehicle body member to the measurement point, based on a detection value detected by the distance sensor,
wherein the transmitters transmit detection waves with a time difference between the adjacent transmitters.

2. The preview road surface detector according to claim 1, wherein the detection waves are transmitted from the transmitters towards the road surface, and
wherein the detection waves are laser waves or millimeter waves.

3. The preview road surface detector according to claim 1, wherein, when at least one of the plurality of transmitters is a first transmitter, the first transmitter further includes a second transmitter arranged ahead or behind the first transmitter in the travel direction of the vehicle, and
wherein the first transmitter and the second transmitter transmit detection waves with a time difference.

4. The preview road surface detector according to claim 3, wherein one or more of the at least one receiver is arranged at an end in a vehicle width direction, and
wherein the transmitters are installed such that transmission directions thereof tilt towards the side of one or more of the at least one receiver.

5. The preview road surface detector according to claim 1,
wherein the plurality of transmitters are divided into a plurality of groups, and
wherein the plurality of transmitters in each group simultaneously transmit detection waves.

6. The preview road surface detector according to claim 1,
wherein the at least one receiver comprises a plurality of receivers, and
wherein transmission directions of the plurality of transmitters that simultaneously transmit the detection waves tilt towards the sides of different receivers among the plurality of receivers.

7. A preview road surface detection method, comprising:
a distance detecting step of detecting a value related to a distance between a vehicle body member and a measurement point on a road surface ahead of a vehicle, the measurement point corresponding to at least a central portion of a road surface contact portion of a wheel, the distance being detected by way of a plurality of transmitters and at least one receiver installed on the vehicle body member and arranged in a direction intersecting a travel direction of a vehicle; and
a distance calculating step of calculating a road surface distance, which is the distance from the vehicle body member to the measurement point, based on a detection value detected in the distance detecting step,
wherein, in the distance detecting step, the transmitters transmit detection waves with a time difference between the adjacent transmitters.

\* \* \* \* \*